US010841731B2

(12) United States Patent
Parab et al.

(10) Patent No.: US 10,841,731 B2
(45) Date of Patent: *Nov. 17, 2020

(54) GEOFENCE COMPOSITIONS

(71) Applicant: Microsoft Technology Licensing, LLC, Redmond, WA (US)

(72) Inventors: Namita Parab, Redmond, WA (US); Emmanouil Koukoumidis, Bellevue, WA (US); Norm Bryar, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/148,960

(22) Filed: Oct. 1, 2018

(65) Prior Publication Data

US 2019/0037343 A1 Jan. 31, 2019

Related U.S. Application Data

(63) Continuation of application No. 14/092,967, filed on Nov. 28, 2013, now Pat. No. 10,136,251.

(51) Int. Cl.
*H04W 4/021* (2018.01)
(52) U.S. Cl.
CPC .................... *H04W 4/021* (2013.01)
(58) Field of Classification Search
CPC ..... H04W 4/021; H04W 4/023; H04W 4/025; H04W 4/02
USPC ............................................. 455/456.1–457
See application file for complete search history.

(56) References Cited

U.S. PATENT DOCUMENTS

| 6,732,826 B2 | 5/2004 | Song et al. |
| 8,755,824 B1 * | 6/2014 | Wang .................... H04W 4/021 455/456.3 |
| 8,965,406 B2 | 2/2015 | Henderson |
| 9,544,728 B2 | 1/2017 | Carmel |
| 2011/0112768 A1 * | 5/2011 | Doyle .................... G06Q 10/08 701/300 |

(Continued)

OTHER PUBLICATIONS

"International Preliminary Report on Patentability Issued in PCT Application No. PCT/US2014/066488", dated Jan. 22, 2016, 7 Pages.

(Continued)

*Primary Examiner* — Marisol Figueroa

(57) ABSTRACT

Architecture that enables geofence combinations and compositions where multiple correlated geofences are generated for an entity such as a point of interest. The geofences can have varying radii relative to a specific entity and represent distinct areas or aspects of the entity. The geofences can relate to correspondingly different categories to which the entity can belong. The geofences can be of differing shapes than circular, such as polygons (e.g., rectangles, squares, etc.). Moreover, these differently shaped geofences can be applied to a single entity. Each geofence of a geofence set associated with an entity can be assigned to represent different parts of an entity such as a part a shopping mall. Geofence composition is obtained by combining multiple primitive geofences to compose more complex geofence(s) for an entity and for embedding the relationship of the primitive geofences into such compositions.

20 Claims, 8 Drawing Sheets

(56) References Cited

U.S. PATENT DOCUMENTS

2013/0268353 A1* 10/2013 Zeto, III ................ G06Q 30/02
                                                        705/14.45
2013/0311567 A1* 11/2013 Lee ......................... H04L 51/20
                                                        709/204
2015/0051953 A1    2/2015 Howe
2017/0238133 A1*  8/2017 Partheesh ............. H04W 4/021
                                                        455/456.1

OTHER PUBLICATIONS

"Office Action Issued in European Patent Application No. 14812064.5", dated Feb. 22, 2019, 4 Pages.
"Final Office Action Issued in Chinese Patent Application No. 201480064346.6", dated Jul. 24, 2019, 10 Pages.
"Second Office Action Issued in Chinese Patent Application No. 201480064346.6", dated Mar. 6, 2019, 8 Pages.
"Office Action Issued in European Patent Application No. 14812064.5", dated Mar. 4, 2020, 4 Pages.

* cited by examiner

GEOFENCE COMPOSITIONS

CROSS-REFERENCE TO RELATED APPLICATIONS

This application is a continuation application and claims priority to U.S. patent application Ser. No. 14/092,967, filed on Nov. 28, 2013, now U.S. Pat. No. 10,136,251, issued on Nov. 20, 2018, entitled "GEOFENCE COMPOSITIONS", this application is incorporated herein by reference in its entirety.

BACKGROUND

Geofences are receiving increasing interest in today's technology uses. A geofence is a virtual area/perimeter defined programmatically around a point of interest (POI) that marks and encompasses an approximate geographical area of that POI. Typically, the geofence is used in combination with evaluation logic to identify if a person or thing is outside the perimeter, contacted the perimeter, or inside the perimeter of the geofence. For example, a user can set a reminder on the user's smartphone to buy milk when at a grocery store. The next time the user is at the grocery store, the geofence "fires" (triggers) and a notification is automatically sent to the user as a reminder to buy milk.

Current solutions exist that enable the user to specify a geofence for a point of interest such as around a home, work, etc.; however, these solutions are limited to a single circular fence configured with geographical coordinates such as latitude, longitude, and radius.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture enables geofence combinations and compositions where multiple correlated geofences are generated for an entity such as a point of interest. The geofences have varying radii relative to a specific geophysical point (defined by latitude/longitude coordinates) (e.g., the approximate center of the entity) and represent distinct areas of the entity. The various geofences can relate to corresponding modes of transport such as walking, riding, driving, flying, etc. Additionally, the geofences of an entity can relate to correspondingly different categories to which the entity can belong (e.g. an entity can operate as a restaurant during the day and as a bar late at night).

The architecture also enables geofences of differing shapes than circular, such as polygons (e.g., rectangles, squares, etc.). Moreover, these differently shaped geofences can be applied to a single entity. Each geofence of a geofence set associated with an entity can be assigned to represent different parts (e.g., sections) of an entity such as a part a shopping mall.

The architecture enables geofence composition by combining multiple primitive geofences to compose more complex geofence(s) for an entity and for embedding the relationship of the primitive geofences into such compositions. For example, the relationships can be to not trigger ("not fire") if moving from one geofence of the composition into a next geofence, or only firing if moving from a lower precision geofence (e.g., a walking geofence) into a higher precision shaped geofence, and so on.

The architecture can include an identification component configured to identify multiple characteristics of an entity, a geofence component (e.g., service) configured to generate multiple geofences for the entity based on the characteristics and apply the geofences to the entity relative to a specific geographical point of the entity, and an evaluation component configured to manage triggering of the multiple geofences based on location of a user device. A specification component enables the specification of representation data as to what each geofence represents relative to the entity.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
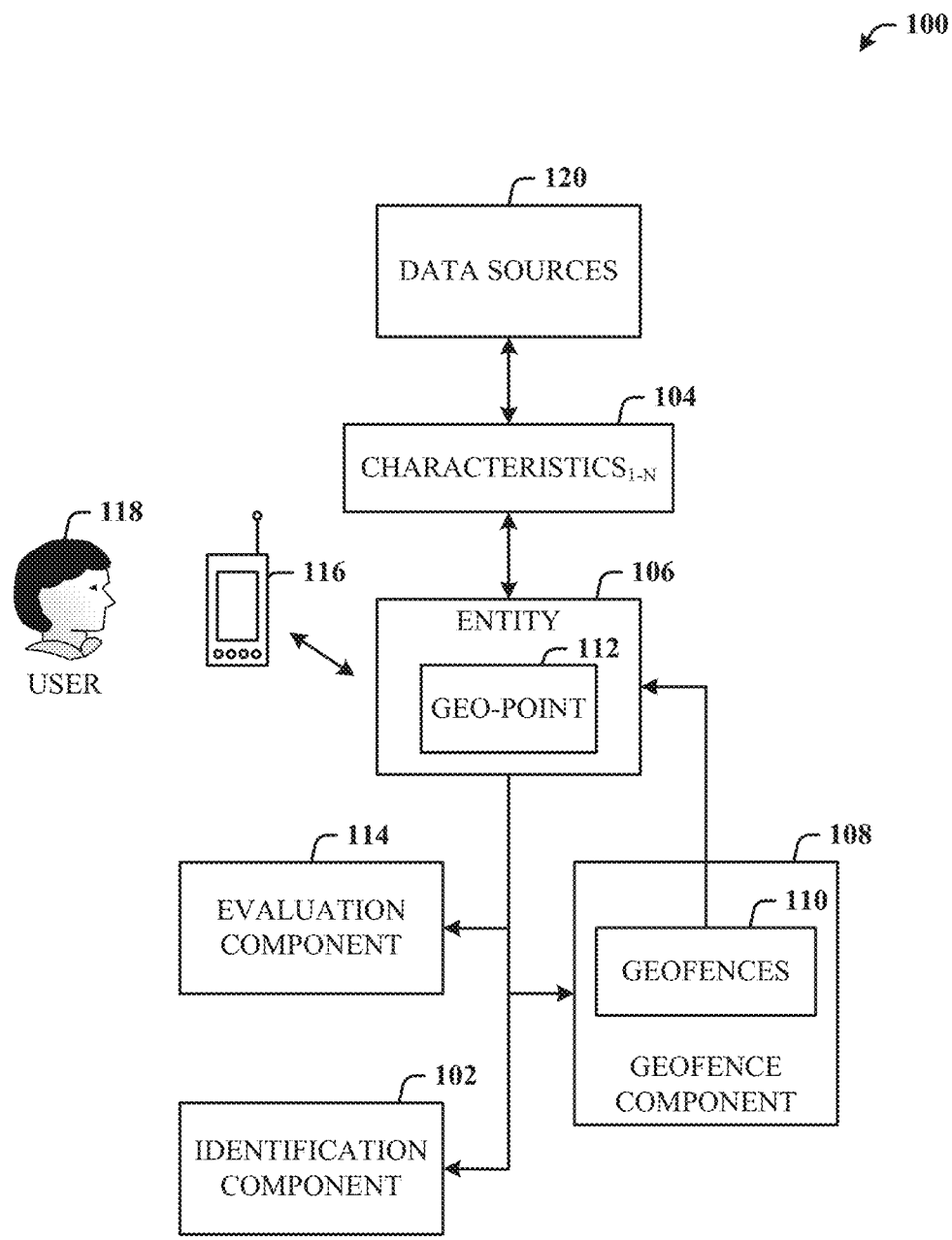
FIG. 1 illustrates a system in accordance with the disclosed architecture.

The disclosed architecture enables geofence combinations and compositions where multiple correlated geofences are generated for an entity such as a point of interest. The geofences can have varying radii relative to a specific geophysical point or entity (defined by latitude/longitude coordinates) (e.g., the approximate center of the entity) and represent distinct areas of the entity. For example, the various geofences can relate to corresponding modes of transport such as walking, riding, public transit, driving, flying, etc. Additionally, the geofences of an entity can relate to correspondingly different categories to which the entity can belong (e.g. an entity can operate as a restaurant during the day and as a bar late at night).

The architecture also enables geofences of shapes different than circular, such as polygons (e.g., rectangles, squares, etc.). Moreover, these differently shaped geofences can be applied to a single entity. Each geofence of a geofence set associated with an entity can be assigned to represent different parts (e.g., sections) of an entity such as a part a shopping mall, body of water, park, etc.

The architecture enables geofence composition by combining multiple primitive geofences to compose more complex geofence(s) for the entity and for embedding the relationship of the primitive geofences into such compositions. For example, the relationships can be to not trigger ("not fire") if moving from one geofence of the composition into a next geofence, or only firing (triggering an event) if moving from a lower precision geofence (e.g., a walking geofence) into a higher precision shaped geofences that closely match the outline or footprint of the entity, sub-entities, and so on.

In one embodiment, concentric geofences can be generated based on characteristics derived about the entity. The concentric geofences can be co-anchored at a computed geographical point (a geo-point) defined according to a specific point coordinates (e.g., latitude/longitude).

There currently exist data sources that collect, analyze, formulate, and enable access to data about entities (or points of interest). The disclosed architecture enables users to now query for these data sources about entities and, define and generate one or more geofences for (e.g., around) these entities. This geofence definition is then used in evaluation logic to identify whether a user is inside or outside of the given geofence and based on this evaluation result trigger corresponding messages or other types of events.

Heuristics are provided that define the size of all the geofences (e.g., concentric) for any particular entity. In one implementation, the heuristics can be based on the category of the entity (e.g., a shopping mall has a bigger radius as compared to a small shop). Moreover, a default configuration can be to predefine the number of geofences assigned to an entity (e.g., three concentric geofences) such as for the shaped geofence, mode of transport, and distances for that entity. In another embodiment, the heuristics can be derived by mining additional databases such as relate to maps of internal layouts of the entity, social check-in data, and crowdsourcing.

The composition of geofences can not only be reduced to concentric (co-anchored around the same location) geofences but for any set of correlated geofences that compose a more complex geofence.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a system 100 in accordance with the disclosed architecture. The system 100 can include an identification component 102 configured to identify multiple characteristics 104 of an entity 106. A geofence component 108 is configured to generate multiple geofences 110 for the entity 106 based on the characteristics 104 and apply the geofences 110 to the entity 106 relative to a specific geographical point (geo-point) 112 of the entity 106. An evaluation component 114 is configured to manage triggering of the multiple geofences 110 based on the location (e.g., geographical) of a user device 116 (of a user 118) relative to the entity 106.

The device 116 can be any device that comprises a geolocation subsystem (e.g., GPS (global positioning system), such as a cellular telephone, tablet PC, handheld devices with geolocation capability, imaging systems (e.g., street cameras, store cameras, etc.) that can identify the user 118 and/or user (device) location.

The geofence component 108 can be configured to enable the generation and assignment of a number of geofences 110 that correspond to different categories to which the entity 106 belongs. The multiple characteristics 104 can be obtained from data sources 120 associated with social check-in data, crowd-sourcing, and social events. The geofence component generates the multiple geofences based on modes of transport used relative to the entity.

Figure 2:
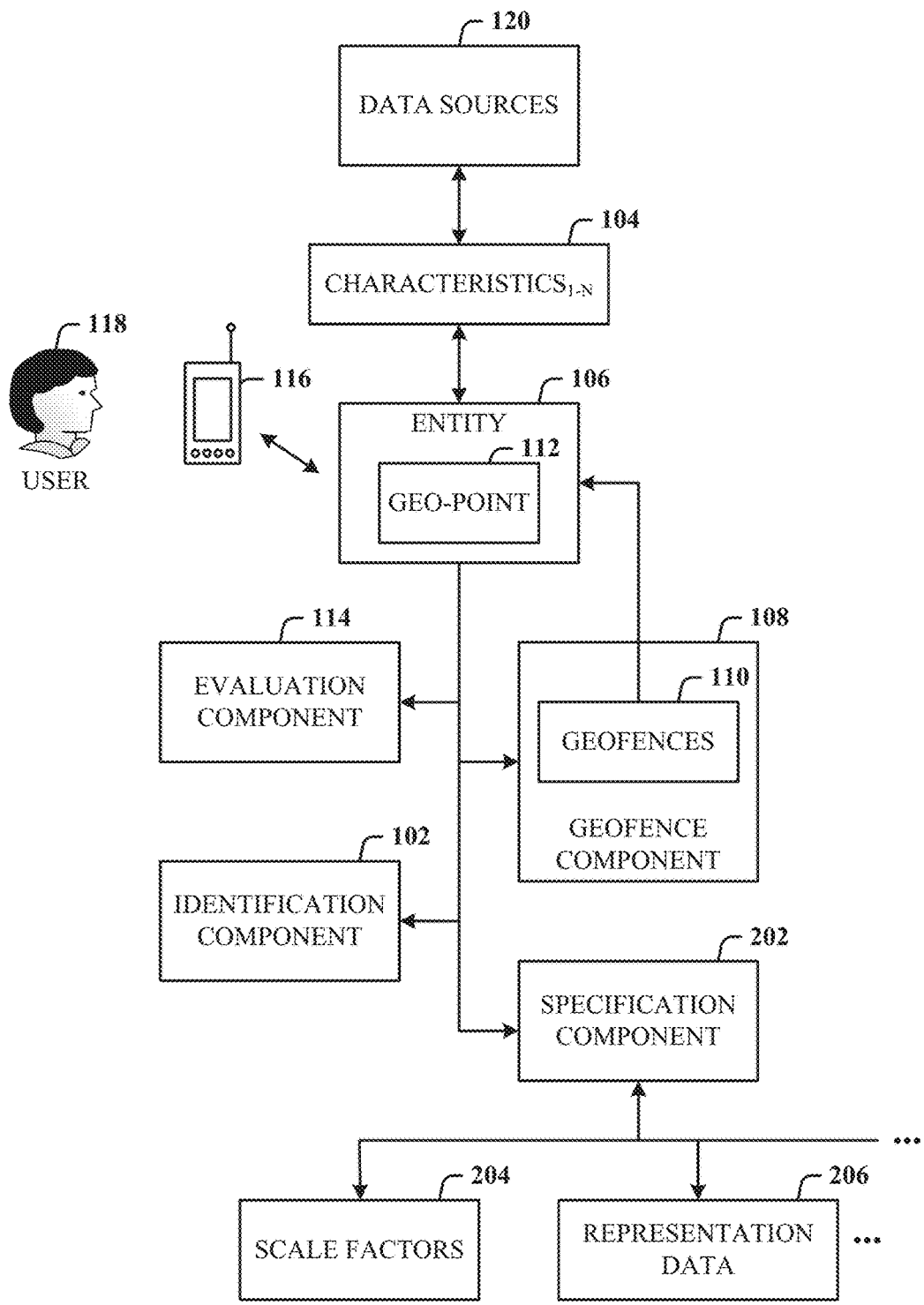
FIG. 2 illustrates an alternative system that further comprises a specification component.

FIG. 2 illustrates an alternative system 200 that further comprises a specification component 202. The system 200 comprises the system 100 of FIG. 1 as well as the specification component 202, which can be configured to enable the specification of scale factors 204 for each of the multiple geofences 110 of the entity 106. Moreover, the specification component 202 can be configured to enable the specification of representation data as to what each geofence represents relative to the entity 106.

It is to be understood that in the disclosed architecture, certain components may be rearranged, combined, omitted, and additional components may be included. Additionally, in some embodiments, all or some of the components are present on the client, while in other embodiments some components may reside on a server or are provided by a local or remove service.

Figure 3:
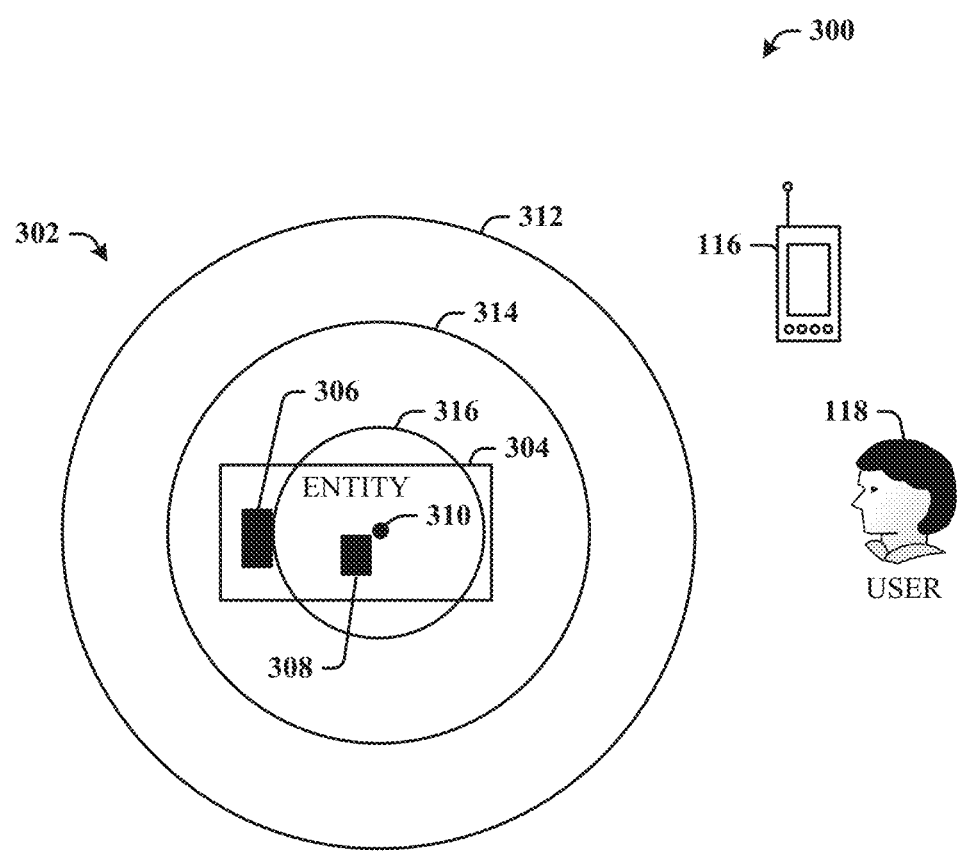
FIG. 3 illustrates a system of concentric geofences associated with an entity.

FIG. 3 illustrates a system 300 of concentric geofences 302 associated with an entity 304. Here, the entity 304 is a building that includes two businesses (also referred to as "sub-entities"): a retail shop 306, and a cinema 308. The identification component 102 can identify multiple characteristics of the entity 304, as well as the sub-entities (306 and 308) such as physical footprint (multiple dimensions such as length, width, height, number of floors, etc.), physical location of the sub-entities (306 and 308) relative to the entity 304 (e.g., inside, outside, along a perimeter wall, etc.), business names, addresses, and other information about the entity and sub-entities, check-in locations, and so on, from the data sources 120.

Accordingly, the identification component 102 computes a geo-point 310 on which the geofences 302 are concentrically aligned (co-anchored). Although not described here, it is to be understood that multiple geofences can also be identified, created, assigned, and triggered for each of the sub-entities (306 and 308) as well, based on identified characteristics of each of the sub-entities (306 and 308).

The geofence component 108 generates the multiple geofences 302 for the entity 304 based on the characteristics and applies (associates in a database) the geofences 302 to the entity 304 relative to the specific geographical point (the geo-point 310) of the entity 304. Here, an outer geofence 312 can be created and assigned to the entity 304, a first inner geofence 314 can be created and assigned to the retail shop 306, and an innermost geofence 316 can be created and assigned to the cinema 308.

As the user 118 and/or user device 116 is detected relative to the geofences 302, the evaluation component 114 manages triggering of the multiple geofences 302 based on location of the user 118 and/or user device 116. The coordinates or other location information of the user/device are matched to coordinate information of the geofences. When there is an agreement, equivalency, or intersection, between the geofence virtual perimeter definition and the location information, a triggered event occurs, such as sending a notification, alert, deal, coupon, etc., for example.

In other words, while the user device 116 may provide one way of user location detection, other means for user location detection include, but are not limited to, check-in data derived from the user 118 entering, leaving, performing a transaction (e.g., a purchase, a return, etc.) related to the entity 304 or any of the sub-entities (306 and 308), and other sensor systems (e.g., store cameras) that process user information to identify the user as being at a specific location in time (e.g., the parking lot outside the entity 304 at noon).

For example, as the user approaches the entity 304 and triggers the outer geofence 312, the entity 304 (e.g., a mall building) can send notices to the user device 116 of free parking, or unimpeded parking at a specific location around the building. Assuming the user 118 has parked at a location within the outer geofence 312 but still outside the first inner geofence 314 (not triggered), as the user 118 keeps moving toward the entity 304, eventually the evaluation component 114 evaluates that the first inner geofence 314 is intersected by the user/user device, and hence, triggers an event associated with the first inner geofence 314. The event can be another notification, but this time issued by the retail shop 306. This notification can be a coupon, deal, for example. As the user 118 continues into the entity 304 (e.g., the mall building), the evaluation component 114 also detects that the user 118 has intersected the innermost geofence 316 (associated with the cinema 308). Accordingly, an associated event can be to send another notification to the user device 116 about shows currently being shown or that will be shown at the cinema 308.

The geofence triggering can also occur as the user moves in the reverse direction (e.g., away from the geo-point 310 and entity 304) to send other notifications. For example, as the user moves from the area of the cinema 308 to the parking location, the user/device location can also be evaluated as leaving the innermost geofence 316. Thus, it is known that although the user 118 may have not attended a showing, the cinema 308 can send a future offer associated with an upcoming show, a thank you, etc., to the user device 116. Similarly, as the user 118 moves outside the first inner geofence 314, the architecture can be programmed to send one or more notices associated with the retail shop 306.

Still further, as the user moves outside the outer geofence 312, this can be detected by the evaluation component 114 as a trigger event and hence, the entity 304 can issue a notice to the user device 116 such as "Thank you for visiting the mall today", or "there is a new <storename> store due to open in three weeks", etc. In this way, the sub-entities (306 and 308) of the entity 304 can subscribe to have the entity 304 send departure notices to the user 118 on behalf of the subscribing sub-entities (306 and 308) as the user triggers the outer geofence 312 while heading to the parking lot.

The disclosed geofence architecture detects the ingress (enter) and egress (exit) of the user 118 relative to a geofence area. In other words, once the user 118 enters the innermost geofence 316, the architecture assumes the user 118 remains in the area of the innermost geofence 316 until an egress event is detected at the perimeter of the geofence. Thus, if the user is still in the area of the innermost geofence 316, the associated cinema 308 may still choose to send notifications to the user device 116. However, these notifications should be carefully planned (e.g., timed, created, etc.) so as to not introduce a negative user experience for the user 118, in which case, the user 118 can disable notifications for that sub-entity 308.

It can be the case that the entities and sub-entities choose or are controlled to only continue sending notifications within a predetermined amount of time after trigger at the geofence perimeter. For example, as the user location triggers (an ingress trigger) the outer geofence 312 when moving toward the entity 304, the entity 304 or the architecture may be configured to only enable notification to be sent for thirty seconds after trigger. Thereafter, the notifications are disabled for the entity 304 until other events are detected, such as an egress trigger when heading to the parking lot.

Moreover, since there are overlapping areas of the geofences 302, the notifications can be sent to the user device 116 based on the overlapping geofence areas. For example, when the user 118 is within the innermost geofence 316, the area of the innermost geofence 316 is also overlapping with area of both the first inner geofence 314 and the outer geofence 312. Accordingly, in one implementation, the user 118 can be sent notifications from all three entities (the entity 304, and the sub-entities (306 and 308)).

However, it may not be desirable to enable this much notification activity to a user. Accordingly, relationship information of the three geofences (the outer geofence 312, the first inner geofence 314, and the innermost geofence 316) can be generated and stored with the geofences. When using purely circular geofences, the relationship information can comprise radii and co-anchor (geo-point) information for the geofences 302. In this way, the overlapping area can be computed as well as directional information of the user 118. Thus, it may not be desirable to enable notifications to be sent as relate to all three entities (entity 304 and sub-entities 306 and 308), but only in association with the last geofence triggered.

Figure 4:
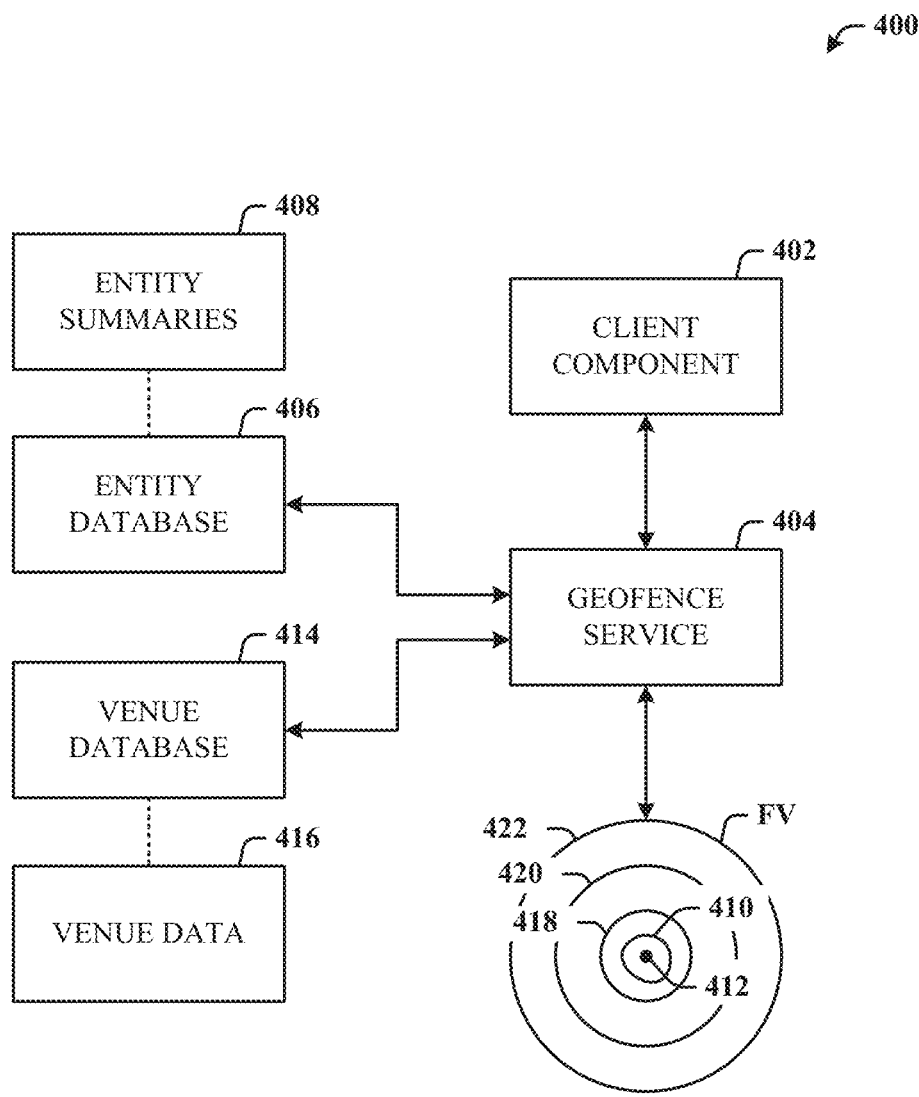
FIG. 4 illustrates an alternative system that facilitates geofence composition in accordance with the disclosed architecture.

FIG. 4 illustrates an alternative system 400 that facilitates geofence composition in accordance with the disclosed architecture. The system 400 depicts a client component 402 on a user device (e.g., user device 116) in communications with a geofence service 404 (e.g., as embodied by the geofence component 108), which can reside on a network (e.g., the Internet) to provide the geofence service 404 to myriad other users and clients of various user devices such as portable computers, tablet computers, smartphones, etc.

The geofence service 404 accesses an entity database 406 of entity summaries 408 (information) about many different entities, such as an entity 410 (having an associated geo-point 412) to be geofenced. The entity summaries can serve as the basis from which to establish the characteristics (e.g., category) about various different entities. The summary is a geographical reference of information about an entity used in conjunction with a map. The summary can include, but is not limited to, information related to the geographical makeup, social statistics and physical features of a country, region, or continent. Other summary information can comprise the entity location, dimensions of peaks and waterways, demographics data such as population, literacy rate, and gross domestic product (industrial output) associated with the entity. This information is generally divided into topics with entries listed in alphabetical order.

For example, a summary about the Seattle Space Needle can include data such as an image of the Space Needle, height, local address, number of floors, when it was opened to the public, architect names, a brief caption (brief summary or description of the entity) about the entity, a link to a more in-depth description about the entity, other linkable data as desired, and so on.

The geofence service 404 can also interface to a venue database 414 to obtain venue data 416 (e.g., map images) related to the entity 410. The venue data 416 can include a detailed structural layout of the entity 410. For example, if the entity 410 is a shopping mall, the venue data 416 can outline the various shops/businesses in the mall to define not only the entity 410 but the sub-entities contained therein.

The venue data 416 in combination with the entity summaries 408 enables the geofence service 404 to define and generate geofences for the entity 410, as well as the geofence relationship data. For example, a set of concentric geofences can be generated for the entity 410 (co-anchored on the geo-point 412). Continuing the example where the entity 410 is the Seattle Space Needle, an innermost geofence 418 can be associated with the outer dimensions of the Space Needle itself, having a minimal radius. A middle geofence 420 can be associated with the geographical area around the Space Needle (e.g., having radius of five miles), and an outer geofence 422 can be associated with the area around Seattle (e.g., having a radius of twenty miles).

Figure 5:
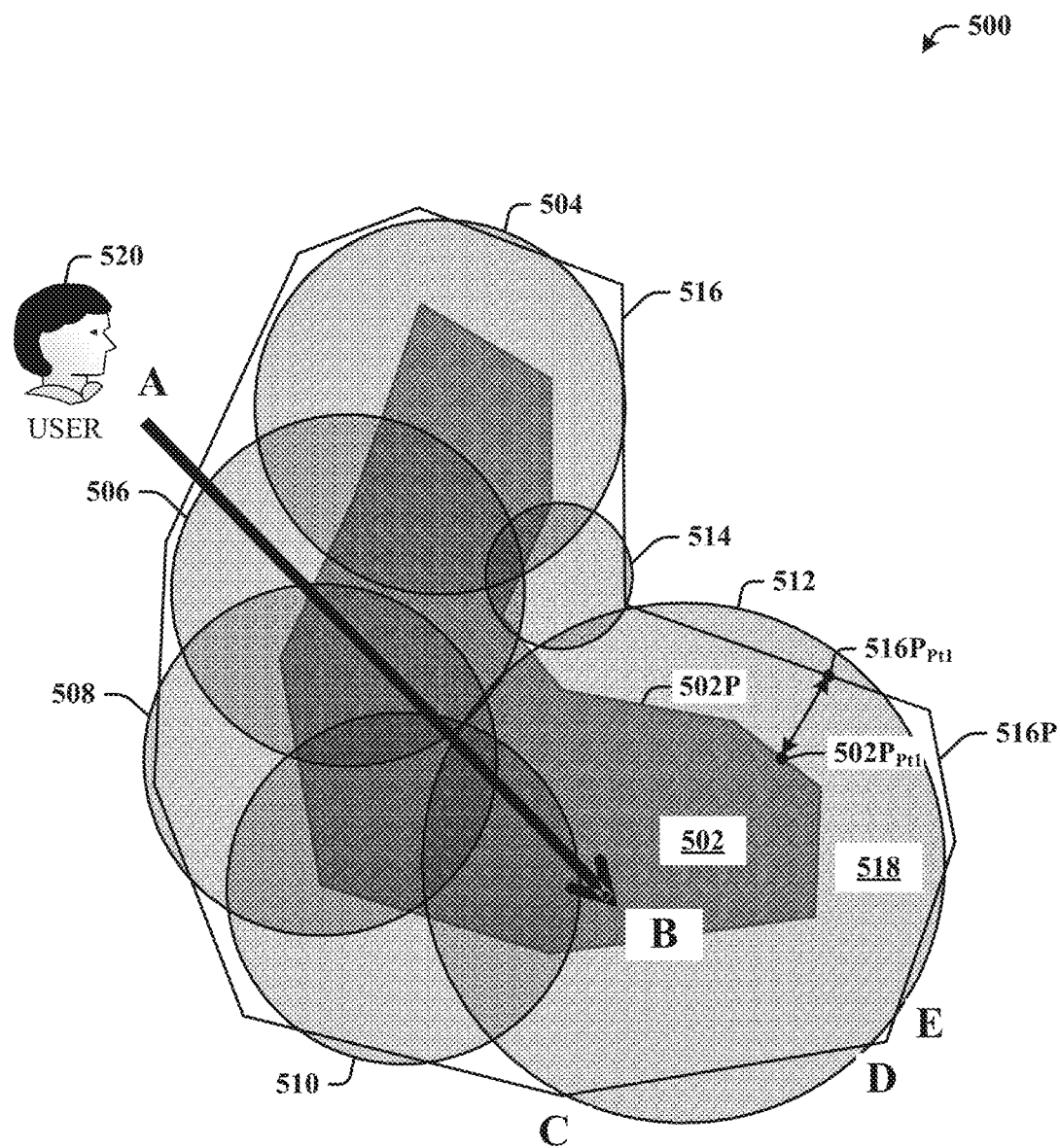
FIG. 5 illustrates a diagram of geofence composition.

FIG. 5 illustrates a diagram 500 of geofence composition. The composition of geofences is not only composed of concentric geofences (co-anchored around the same location), but also for any set of correlated geofences that together compose a more complex geofence.

In this example, an irregularly formed entity 502 (e.g., a body of water such as a lake, a park, etc.) is defined as having a perimeter 502P and an associated group of correlated primitive geofences (also referred to as constituent geofences): a first geofence 504, a second geofence 506, a third geofence 508, a fourth geofence 510, a fifth geofence 512, and a sixth geofence 514. The set of primitive geofences are employed to define a programmatically derived virtual trigger perimeter 516P that identifies a "shaped" composite geofence 516 (designed to approximate the shape of the entity about which it is intended) around the entity 502 and that approximates the shape of the entity 502.

Moreover, based on the placement of the primitive geofences relative to the entity 502, the virtual trigger perimeter 516P not only closely approximates the shape of the entity 502, but can also be sized to incorporate a zone 518 about the entity 502 based on the sizes of the associated primitive geofences. The zone 518 is defined generally as the area between points (e.g., a point $502P_{Pt1}$) on the entity perimeter 502P to points (e.g., a point $516P_{Pt1}$) on the virtual trigger perimeter 516P.

The shaped geofence 516 can be assigned a general trigger event (e.g., an alert, notification, device control operation, etc.) such that geolocation coordinates of a user 520 (user device) evaluated as intersecting (matching) a coordinate point $516P_{Pti}$ (where i is an integer) of the trigger perimeter 516P. Since the shaped geofence 516 is a composite of the group of primitive geofences, and each individual primitive geofence typically may have its own event trigger, the composite geofence, in one implementation, only triggers a single event no matter the direction of movement by the user 520 through the primitive geofences of the composite geofence 516. In other words, movement of the user 520 from point A to point B does not cause triggering of the second geofence 506, the third geofence 508, the fourth geofence 510, or the fifth geofence 512. Rather, the composite geofence 516 retains the embedded relationship of the group of geofences such that only a single event activated by intersection of the user 520 with the composite geofence 516 (geofence perimeter 516P).

Alternatively, it can be desired to fire a single event for the composite geofence perimeter 516P, but then also for one or more of the constituent geofences as selected. For example, consider that the entity is a lake around which people drive for outdoor fun and entertainment. The geofence for the lake is composed from a set of correlated geofences ("geofence tessellation"). Not only do the constituent geofences (504, 506, 508, 510, 512, and 514) assist in generating the composite geofence 516, but they also identify lakeside stores, parks, shops, etc., around the lake. Thus, as the user 520 travels around the lake on a lake road (typical for many lakes), that may approximate the physical location of the virtual composite geofence perimeter 516, for example, the user may trigger not only the composite geofence 516, but individual geofences for the individual stores, shops, gas stations, boat launches, etc., from which the user can trigger and be pushed deals, or from which the user device will pull deals or other notifications specific to those retail entities.

The disclosed architecture can enable single triggers for constituent geofences such that, in this case, the user 520 is not inundated with notices from repeated triggering of the same constituent geofence (e.g., the fifth geofence 512). Thus, while moving in a counterclockwise direction about the lake (the entity 502) on a road that closely matches the location of the virtual perimeter 516P, the user 520 may only trigger a first event from intersecting the fifth geofence 512 at a point C, and not subsequent repetitions of the same event (notification) or other events (a different notification), at points D (an exit trigger) and E (a reentry trigger), for example, although this can be enabled as desired.

This applies equally to other large irregularly shaped entities such as the entity 502 being a shopping mall or an airport. The disclosed capabilities can enable an airline gate agent to identify the location of a delayed traveler heading through an airport to a soon-departing flight, for example. It can also improve the user travel experience by triggering direct notification to the user in the airport of information generally deemed important to the traveler such as gate changes, departure changes, the location of a companion flyer relative to the user, where the user may be the entity and has an assigned geofence that moves with the user and triggers on subscribing user who chooses to participate in this personal service of the user, and so on.

Thus, the geofence component 108 can be configured to enable composition of the multiple geofences into a single complex geofence. The geofence component 108 can also be configured to enable embedding of relationship information of the multiple geofences as part of a composition of the multiple geofences.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 6:
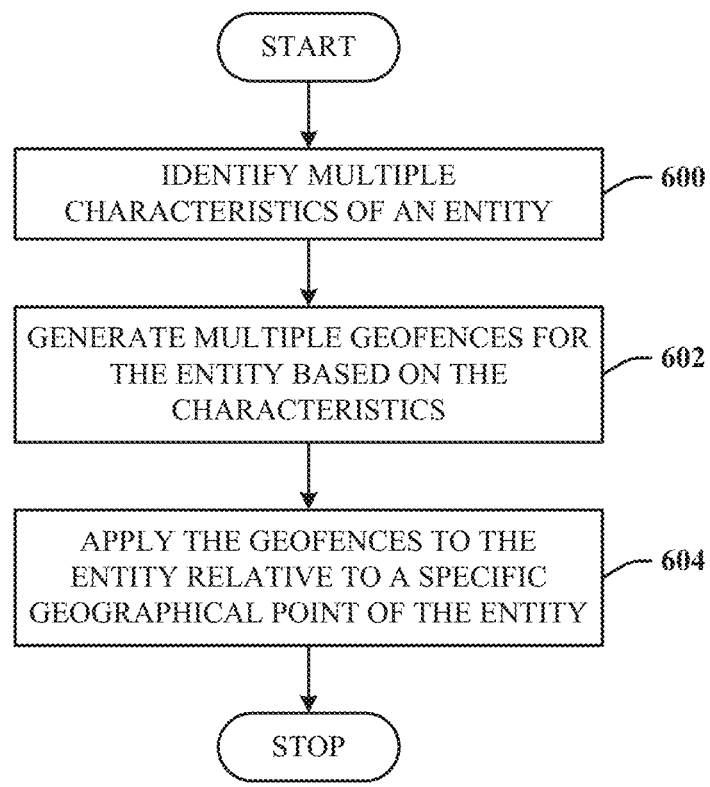
FIG. 6 illustrates a method in accordance with the disclosed architecture.

FIG. 6 illustrates a method in accordance with the disclosed architecture. At 600, multiple characteristics of an entity are identified. The characteristics include, but are not limited to physical dimensions of the entity, type of business, address, operating hours, certain employee identities, etc. At 602, multiple geofences are generated for the entity based on the characteristics. For example, if the characteristics indicate the entity is a large retail clothing store with many different departments, a set of geofences can be generated for an area around the location of the store, for the store itself, and another for the specific department that may be having a sale. At 604, the geofences are applied to the entity relative to a specific geographical point of the entity. When considering concentric geofences, the geographical point of the entity can be computed as a center of the entity on which the geofences are co-anchored (or aligned).

The method can further comprise generating circular geofences of different radii based on corresponding different characteristics of the entity and applying the circular geofences concentrically on the geographical point. The method can further comprise generating the multiple geofences according to correspondingly different modes of transport. For example, if the geographical area in which the entity is located, is blocked off for a weekend event, the mode of transport geofences may be larger as people are likely to be walking than driving. The method can further comprise generating the multiple geofences according to correspondingly different categories to which the entity belongs. For example, if the categories for the entity are a karate studio during the day and dance studio at night, these category characteristics can be used to define the size and shape of the geofences applied.

The method can further comprise specifying scale factors for the geofences of the entity. If considering purely circular geofences, the radii of all geofences or the radius of a specific geofence of the set of geofences can be scaled based on events related to the entity, environmental events for the area of the entity, road conditions, deals, coupons, traffic conditions, etc.

The method can further comprise assigning one or more of the characteristics to each geofence. The method can further comprise generating a composite geofence as a composition of multiple geofences associated with the entity. The method can further comprise managing trigger of each of the multiple geofences.

Figure 7:
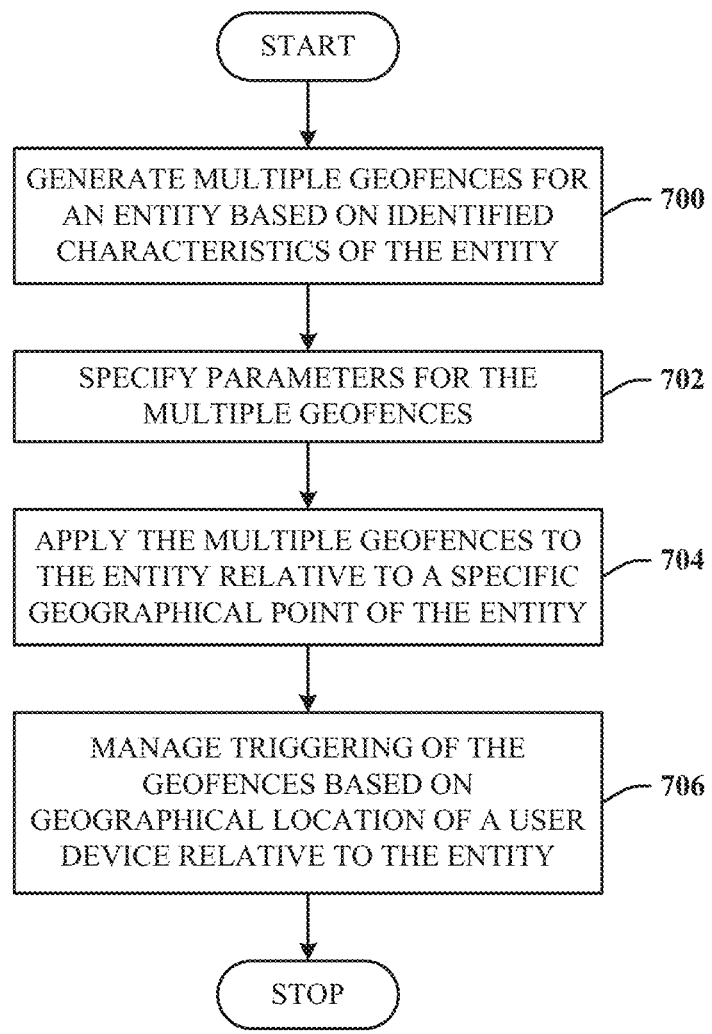
FIG. 7 illustrates an alternative method in accordance with the disclosed architecture.

FIG. 7 illustrates an alternative method in accordance with the disclosed architecture. At 700, multiple geofences are generated for an entity based on identified characteristics of the entity. At 702, parameters are specified for the multiple geofences. At 704, the multiple geofences are applied to the entity relative to a specific geographical point of the entity. At 706, triggering of the geofences is managed based on geographical location of a user device relative to the entity.

The method can further comprise specifying parameters related to scale factors of the multiple geofences and what each geofence represents. The method can further comprise generating a composition geofence that is a composition of the multiple geofences. The method can further comprise managing triggering based on type of a first geofence relative to a type of a second geofence of the multiple geofences.

As used in this application, the terms "component" and "system" are intended to refer to a computer-related entity, either hardware, a combination of software and tangible hardware, software, or software in execution. For example, a component can be, but is not limited to, tangible physical components such as a microprocessor, chip memory, mass storage devices (e.g., optical drives, solid state drives, and/or magnetic storage media drives), and computers, and software components such as a process running on a microprocessor, an object, an executable, a data structure (stored in a volatile or a non-volatile storage medium), a module, a thread of execution, and/or a program.

By way of illustration, both an application running on a server and the server can be a component. One or more components can reside within a process and/or thread of execution, and a component can be localized on one computer and/or distributed between two or more computers.

The word "exemplary" may be used herein to mean serving as an example, instance, or illustration. Any aspect or design described herein as "exemplary" is not necessarily to be construed as preferred or advantageous over other aspects or designs.

Figure 8:
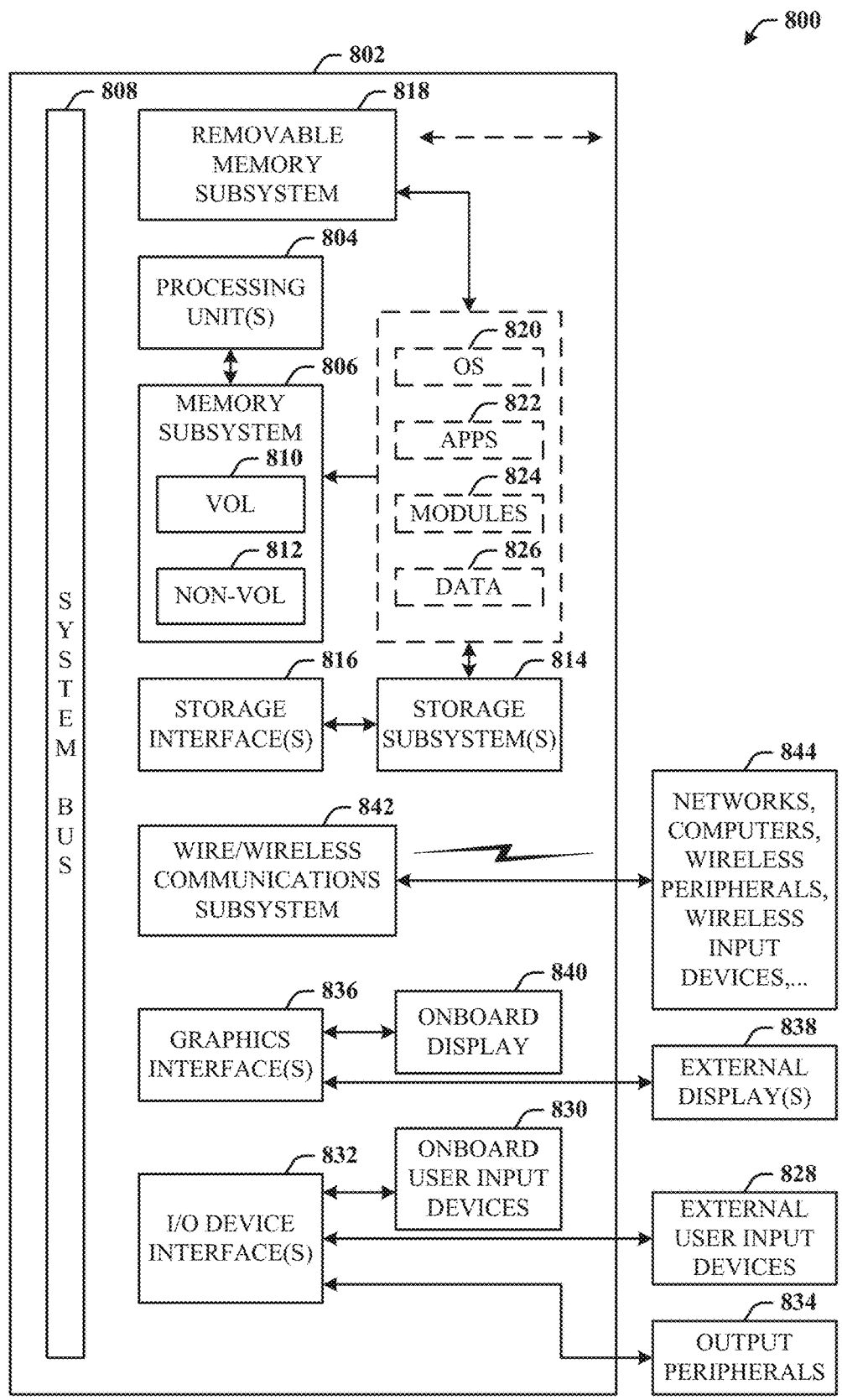
FIG. 8 illustrates a block diagram of a computing system that executes geofence composition in accordance with the disclosed architecture.

Referring now to FIG. 8, there is illustrated a block diagram of a computing system 800 that executes geofence composition in accordance with the disclosed architecture. However, it is appreciated that the some or all aspects of the disclosed methods and/or systems can be implemented as a system-on-a-chip, where analog, digital, mixed signals, and other functions are fabricated on a single chip substrate.

In order to provide additional context for various aspects thereof, FIG. 8 and the following description are intended to provide a brief, general description of the suitable computing system 800 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 800 for implementing various aspects includes the computer 802 having microprocessing unit(s) 804 (also referred to as microprocessor(s) and processor(s)), a computer-readable storage medium such as a system memory 806 (computer readable storage medium/media also include magnetic disks, optical disks, solid state drives, external memory systems, and flash memory drives), and a system bus 808. The microprocessing unit(s) 804 can be any of various commercially available microprocessors such as single-processor, multi-processor, single-core units and multi-core units of processing and/or storage circuits. Moreover, those skilled in the art will appreciate that the novel system and methods can be practiced with other computer system configurations, including minicomputers, mainframe computers, as well as personal computers (e.g., desktop, laptop, tablet PC, etc.), hand-held computing devices, microprocessor-based or programmable consumer electronics, and the like, each of which can be operatively coupled to one or more associated devices.

The computer 802 can be one of several computers employed in a datacenter and/or computing resources (hardware and/or software) in support of cloud computing services for portable and/or mobile computing systems such as wireless communications devices, cellular telephones, and other mobile-capable devices. Cloud computing services, include, but are not limited to, infrastructure as a service, platform as a service, software as a service, storage as a service, desktop as a service, data as a service, security as a service, and APIs (application program interfaces) as a service, for example.

The system memory 806 can include computer-readable storage (physical storage) medium such as a volatile (VOL) memory 810 (e.g., random access memory (RAM)) and a non-volatile memory (NON-VOL) 812 (e.g., ROM, EPROM, EEPROM, etc.). A basic input/output system (BIOS) can be stored in the non-volatile memory 812, and includes the basic routines that facilitate the communication of data and signals between components within the computer 802, such as during startup. The volatile memory 810 can also include a high-speed RAM such as static RAM for caching data.

The system bus 808 provides an interface for system components including, but not limited to, the system memory 806 to the microprocessing unit(s) 804. The system bus 808 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 802 further includes machine readable storage subsystem(s) 814 and storage interface(s) 816 for interfacing the storage subsystem(s) 814 to the system bus 808 and other desired computer components and circuits. The storage subsystem(s) 814 (physical storage media) can include one or more of a hard disk drive (HDD), a magnetic floppy disk drive (FDD), solid state drive (SSD), flash drives, and/or optical disk storage drive (e.g., a CD-ROM drive DVD drive), for example. The storage interface(s) 816 can include interface technologies such as EIDE, ATA, SATA, and IEEE 1394, for example.

One or more programs and data can be stored in the memory subsystem 806, a machine readable and removable memory subsystem 818 (e.g., flash drive form factor technology), and/or the storage subsystem(s) 814 (e.g., optical, magnetic, solid state), including an operating system 820, one or more application programs 822, other program modules 824, and program data 826.

The operating system 820, one or more application programs 822, other program modules 824, and/or program data 826 can include items and components of the system 100 of FIG. 1, items and components of the system 200 of FIG. 2, that facilitate the system 300 of FIG. 3, items and components of the system 400 of FIG. 4, that facilitate the diagram 500 of FIG. 5, and the methods represented by the flowcharts of FIGS. 6 and 7, for example.

Generally, programs include routines, methods, data structures, other software components, etc., that perform particular tasks, functions, or implement particular abstract data types. All or portions of the operating system 820, applications 822, modules 824, and/or data 826 can also be cached in memory such as the volatile memory 810 and/or non-volatile memory, for example. It is to be appreciated that the disclosed architecture can be implemented with various commercially available operating systems or combinations of operating systems (e.g., as virtual machines).

The storage subsystem(s) 814 and memory subsystems (806 and 818) serve as computer readable media for volatile and non-volatile storage of data, data structures, computer-executable instructions, and so on. Such instructions, when executed by a computer or other machine, can cause the computer or other machine to perform one or more acts of a method. Computer-executable instructions comprise, for example, instructions and data which cause a general purpose computer, special purpose computer, or special purpose microprocessor device(s) to perform a certain function or group of functions. The computer executable instructions may be, for example, binaries, intermediate format instructions such as assembly language, or even source code. The instructions to perform the acts can be stored on one medium, or could be stored across multiple media, so that the instructions appear collectively on the one or more computer-readable storage medium/media, regardless of whether all of the instructions are on the same media.

Computer readable storage media (medium) exclude (excludes) propagated signals per se, can be accessed by the computer 802, and include volatile and non-volatile internal and/or external media that is removable and/or non-removable. For the computer 802, the various types of storage media accommodate the storage of data in any suitable digital format. It should be appreciated by those skilled in the art that other types of computer readable medium can be employed such as zip drives, solid state drives, magnetic tape, flash memory cards, flash drives, cartridges, and the like, for storing computer executable instructions for performing the novel methods (acts) of the disclosed architecture.

A user can interact with the computer 802, programs, and data using external user input devices 828 such as a keyboard and a mouse, as well as by voice commands facilitated by speech recognition. Other external user input devices 828 can include a microphone, an IR (infrared) remote control, a joystick, a game pad, camera recognition systems, a stylus pen, touch screen, gesture systems (e.g., eye movement, body poses such as relate to hand(s), finger(s), arm(s), head, etc.), and the like. The user can interact with the computer 802, programs, and data using onboard user input devices 830 such a touchpad, microphone, keyboard, etc., where the computer 802 is a portable computer, for example.

These and other input devices are connected to the microprocessing unit(s) 804 through input/output (I/O) device interface(s) 832 via the system bus 808, but can be connected by other interfaces such as a parallel port, IEEE 1394 serial port, a game port, a USB port, an IR interface, short-range wireless (e.g., Bluetooth) and other personal area network (PAN) technologies, etc. The I/O device interface(s) 832 also facilitate the use of output peripherals 834 such as printers, audio devices, camera devices, and so on, such as a sound card and/or onboard audio processing capability.

One or more graphics interface(s) 836 (also commonly referred to as a graphics processing unit (GPU)) provide graphics and video signals between the computer 802 and external display(s) 838 (e.g., LCD, plasma) and/or onboard displays 840 (e.g., for portable computer). The graphics interface(s) 836 can also be manufactured as part of the computer system board.

The computer 802 can operate in a networked environment (e.g., IP-based) using logical connections via a wired/wireless communications subsystem 842 to one or more networks and/or other computers. The other computers can include workstations, servers, routers, personal computers, microprocessor-based entertainment appliances, peer devices or other common network nodes, and typically include many or all of the elements described relative to the computer 802. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 802 connects to the network via a wired/wireless communication subsystem 842 (e.g., a network interface adapter, onboard transceiver subsystem, etc.) to communicate with wired/wireless networks, wired/wireless printers, wired/wireless input devices 844, and so on. The computer 802 can include a modem or other means for establishing communications over the network. In a networked environment, programs and data relative to the computer 802 can be stored in the remote memory/storage device, as is associated with a distributed system. It will be appreciated that the network connections shown are exemplary and other means of establishing a communications link between the computers can be used.

The computer 802 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi™ (used to certify the interoperability of wireless computer networking devices) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related technology and functions).

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   at least one processor; and
   a memory storing computer-executable instructions that, when executed by the at least one processor, perform a method, comprising:
   determining a plurality of characteristics of an entity, wherein the plurality of characteristics comprise at least an entity type and an entity size;
   automatically generating multiple virtual perimeters for the entity based, at least in part, on the plurality of characteristics;
   triggering at least one virtual perimeter of the multiple virtual perimeters based, at least in part, on a detected location of a device; and
   automatically generating and providing a notification when the at least one virtual perimeter of the multiple virtual perimeters has been triggered.

2. The system of claim 1, further comprising instructions for specifying parameters for at least one of the multiple virtual perimeters.

3. The system of claim 2, wherein specifying parameters comprises receiving input that indicates a value for at least one of the parameters.

4. The system of claim 1, wherein a placement of at least one of the multiple virtual perimeters is based, at least in part, on map information associated with the entity.

5. The system of claim 1, further comprising instructions for combining the multiple virtual perimeters into a single virtual perimeter.

6. The system of claim 1, wherein determining the plurality of characteristics of the entity comprises determining a layout of the entity.

7. The system of claim 1, further comprising instructions for associating a first virtual perimeter of the multiple virtual perimeters with a first sub-entity of the entity and associating a second virtual perimeter of the multiple virtual perimeters with a second sub-entity of the entity.

8. The system of claim 7, wherein a first virtual perimeter of the multiple virtual perimeters originates from a first location and a second virtual perimeter of the multiple virtual perimeters originates from a second location that is different than the first location.

9. A method, comprising:
   determining a plurality of characteristics of an entity, wherein the plurality of characteristics comprise at least an entity type and an entity size;
   generating multiple virtual perimeters for the entity based, at least in part, on the plurality of characteristics;
   automatically applying each virtual perimeter of the multiple virtual perimeters to a specific geographical point associated with the entity; and
   when an electronic device triggers activation of at least one virtual perimeter of the multiple virtual perimeters, automatically generating a notification that indicates the electronic device has activated the virtual perimeter.

10. The method of claim 9, wherein a dimension of one or more of the virtual perimeters is based, at least in part, on the plurality of characteristics.

11. The method of claim 9, further comprising instructions for specifying parameters for at least one of the multiple virtual perimeters.

12. The method of claim 11, wherein specifying parameters comprises receiving input that indicates a value for at least one of the parameters.

13. The method of claim 9, further comprising receiving map information associated with the entity.

14. The method of claim 13, wherein a placement of at least one of the multiple virtual perimeters is based, at least in part, on the map information.

15. The method of claim 9, further comprising obtaining layout information associated with the entity.

16. The method of claim 9, wherein at least one of the multiple virtual perimeters is a geofence.

17. A system, comprising:
   at least one processor; and
   a memory storing computer-executable instructions that, when executed by the at least one processor, perform a method, comprising:
   automatically generating multiple virtual perimeters for an entity based, at least in part, on a plurality of characteristics associated with the entity, wherein the plurality of characteristics comprise at least an entity type and an entity size;
   specifying parameters for each of the multiple virtual perimeters;
   automatically applying the multiple virtual perimeters to the entity relative to a specific geographical point of the entity;
   detecting a triggering of at least one virtual perimeter of the multiple virtual perimeters based, at least in part, on a geographical location of an electronic device; and
   automatically generating and providing a notification associated with the triggered virtual perimeter.

18. The system of claim 17, wherein the parameters are based, at least in part, on the plurality of characteristics.

19. The system of claim 17, further comprising instructions for receiving map information associated with the entity.

20. The system of claim 19, where a location of at least one virtual perimeter of the multiple virtual perimeters is based, at least in part, on the map information.

\* \* \* \* \*